(12) United States Patent
Lyons et al.

(10) Patent No.: US 10,257,171 B2
(45) Date of Patent: Apr. 9, 2019

(54) SERVER PUBLIC KEY PINNING BY URL

(71) Applicant: CA, Inc., New York, NY (US)

(72) Inventors: Mike Arnold Lyons, Vancouver (CA); Vincent Chan, Burlingame, CA (US); Richard Jason Refuerzo Raquepo, Burnaby (CA)

(73) Assignee: CA, Inc., Austin, TX (US)

( * ) Notice: Subject to any disclaimer, the term of this patent is extended or adjusted under 35 U.S.C. 154(b) by 420 days.

(21) Appl. No.: 14/846,199

(22) Filed: Sep. 4, 2015

(65) Prior Publication Data
US 2017/0070486 A1    Mar. 9, 2017

(51) Int. Cl.
*H04L 29/06* (2006.01)

(52) U.S. Cl.
CPC ........ *H04L 63/0442* (2013.01); *H04L 63/061* (2013.01); *H04L 63/0272* (2013.01); *H04L 63/0876* (2013.01); *H04L 63/166* (2013.01)

(58) Field of Classification Search
CPC ..... H04L 63/0442; H04L 63/061; H04L 9/00; H04L 9/32; G11B 20/00; G06F 21/12; G06F 21/16; G06F 17/30; G10L 19/018
USPC .................................. 713/160, 176; 382/100
See application file for complete search history.

(56) References Cited

U.S. PATENT DOCUMENTS

| | | | | |
|---|---|---|---|---|
| 7,716,139 | B2 * | 5/2010 | Brown | G06Q 20/0855 705/65 |
| 7,925,027 | B2 * | 4/2011 | Kempf | H04L 29/12 380/232 |
| 2015/0331675 | A1 * | 11/2015 | De Magalhaes | G06F 8/20 717/104 |
| 2017/0054708 | A1 * | 2/2017 | Zaw | H04L 63/0823 |

OTHER PUBLICATIONS

Bernstein Discussion, Hacker News, downloaded from https://news.ycombinator.com/item?id=2047855, Jan. 6, 2016, 3 pages.
D.J. Bernstein talk, "High-speed high security cryptography: encrypting and authenticating the whole internet," University of Illinois at Chicago, Dec. 28, 2010, 94 pages.
(Continued)

*Primary Examiner* — Thanhnga B Truong
(74) *Attorney, Agent, or Firm* — Vierra Magen Marcus LLP

(57) ABSTRACT

A method of ensuring the identity of a first processing device to a second processing device allows for secure network communication between the devices. A network resource address including an encoded trusted identifier in a portion of the address excluding the host name of the first processing device are provided to a second processing device by a trusted distribution mechanism. The trusted identifier is derived from a public key of the first processing device. Communication is initiated with the first processing device at the network resource address and a public key purporting to identify the first processing device is received in response to initiating the communication. The trusted identifier is compared to a transformation of at least a portion of the public key to determine a match between the identifier and the transformation. If the trusted identifier and the transformation match, the identity of the first processing device is verified.

16 Claims, 7 Drawing Sheets

(56) References Cited

OTHER PUBLICATIONS

DNS vs. Bernstein, Thomas H. Ptacek, downloaded from http://osdir.com/ml/security.firewalls.wizards/2003-02/msg00087.html, Jan. 6, 2016, 6 pages.
"Public key pinning," Imperial Violet, downloaded from https://www.imperialviolet.org/2011/05/04/pinning.html, May 4, 2011, 3 pages.
"Nym-based security," Bernstein, Mar. 9, 2000, 1 page.

* cited by examiner

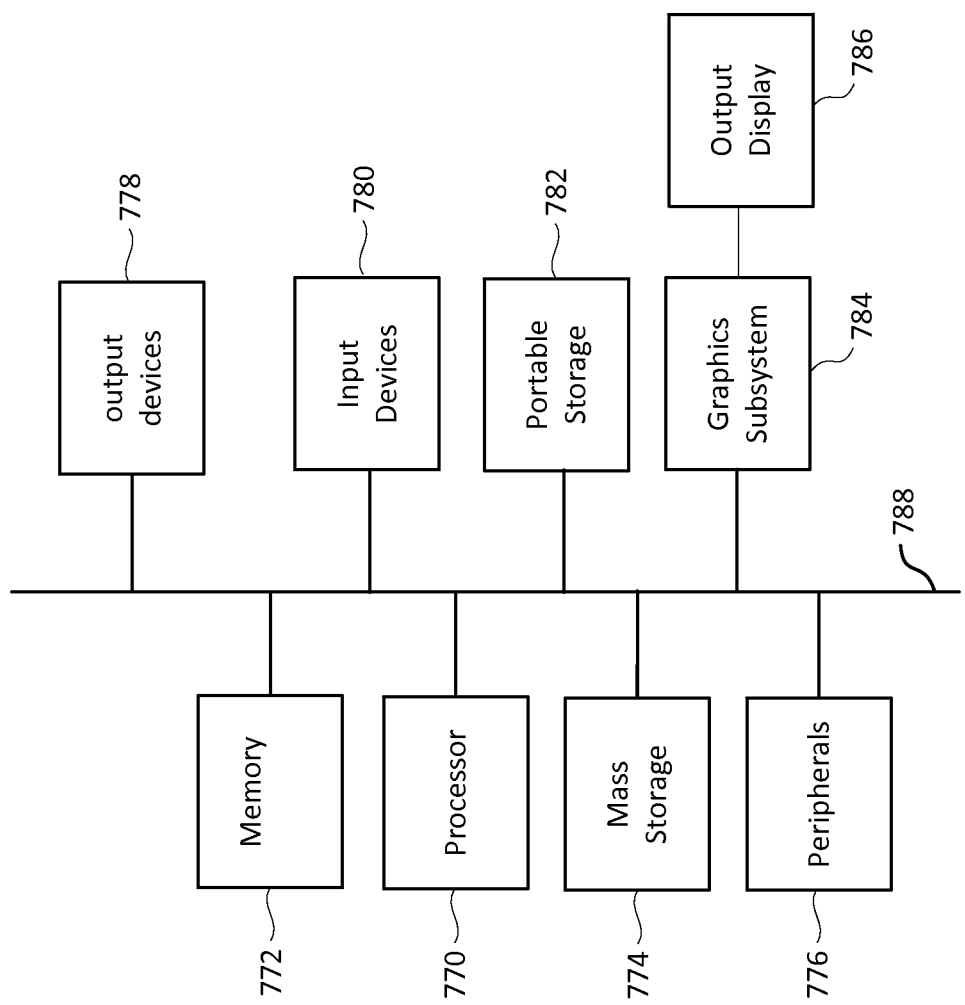

SERVER PUBLIC KEY PINNING BY URL

BACKGROUND

A number of techniques have been developed to secure communication between processing devices over unsecure networks, including the Internet. Transport Layer Security (TLS) is a cryptographic technique to provide security and data integrity for communications over TCP/IP networks such as the Internet. TLS often authenticates an endpoint (or server) using a Public Key Infrastructure (PKI) which is an arrangement that binds public keys with respective user identities by means of a certificate authority (CA). The user identity must be unique within each CA domain. TLS security can sometimes be compromised. For example, an endpoint may use a self-signed TLS certificate, not tied to a CA. CA's can be impersonated and imposter certificates issued, or an attacker may first add an imposter certificate to a mobile device certificate store to take control of a network connection and intercept application programming interface (API) communications between an API and another application on the mobile device. This may occur through a loss of control of one of the CA's private keys or where the CA issues an open intermediate certificate to a customer, allowing the customer to issue a certificate for any domain.

BRIEF SUMMARY

According to one aspect of the present disclosure, technology is described which provides a method of identifying a first processing device to a second processing device to allow secure network communications. The method includes securely receiving a network resource address including an encoded identifier of the first processing device. The identifier is derived from a public key of the first processing device. Communication is initiated with the first processing device at the network resource address. A public key purporting to identify the first processing device is received in response to initiating the communication. The method further includes comparing the identifier to a transformation of at least a portion of the public key to determine a match between the identifier and the transformation, and if the identifier and the transformation match, further communicating with the first processing device, and if the identifier and the transformation do not match ending communicating with the first processing device.

Another embodiment of the technology includes a computer program product a computer readable storage medium having computer readable program code configured to contact a first processing device providing an application resource via a network, the application resource identified by a uniform resource locator (URL) having an encoded identifier of a public key identifying the first processing device, the identifier pinned to the URL. The computer readable program code is further configured to receive a public key certificate purporting to identify the first processing device. The computer readable program code is configured to allow communication with the first processing device when a hash of at least a portion of the public key certificate purporting to identify the first processing device matches the identifier. The computer readable program code is further configured to communicate with the first processing device based on the code configured to allow communication.

Another embodiment provides a method of securing network communications. The method includes receiving a request to enroll a first processing device in a secure communication system adapted to allow the first processing device to access resources of a second processing device via a secure communication channel over a public network. A URL is distributed to the first processing device. The URL is adapted to allow access to the resources of the second processing device, the URL including an encoded identifier derived from a public key of the second processing device, the identifier pinned to the URL such that upon receipt from the second processing device of a public key certificate purporting to identify the second processing device, authorization of communication with the second processing device may occur by extraction of the identifier from the URL and comparison of the identifier to a hash of at least a portion the public key certificate purporting to identify the second processing device. In one aspect, the resources comprise an API management portal, and a unique token is distributed with the URL and trusted identifier. The unique token is adapted to identify the first processing device to the API management portal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 7 is an exemplary processing device.

DETAILED DESCRIPTION

Figure 1:
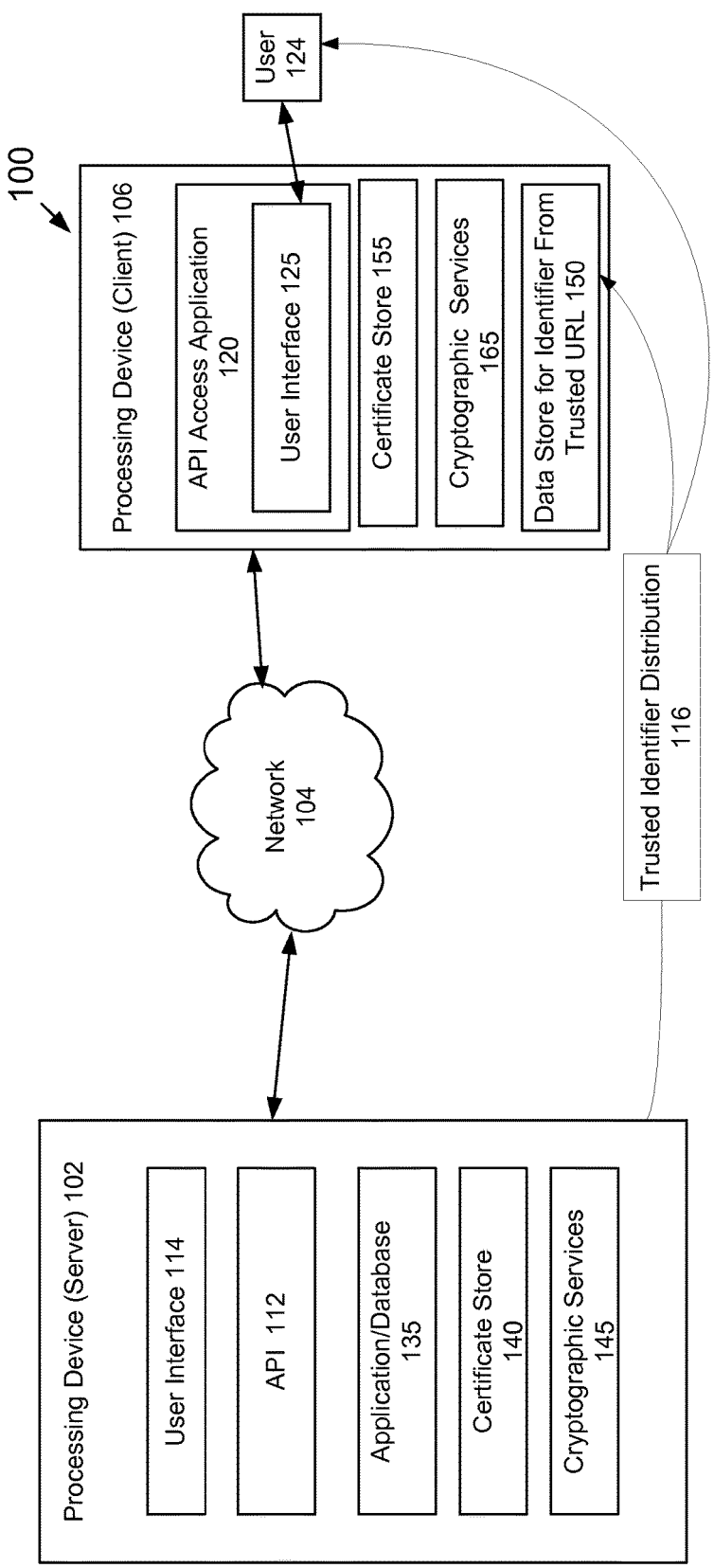
FIG. 1 illustrates an exemplary computing environment in which the present technology may be utilized.

Technology is presented which allows authentication of one processing device by another before a communication occurs over a public network. A trusted identifier and a network endpoint are distributed via a secure distribution channel to a first processing device. The trusted identifier is a trusted identification of a second, network connected processing device which may be used to check the identity of the second processing device when initiating a communication. When the first device initiates a communication with the second processing device, the second processing device returns a public key purporting to identify the second device. Using the trusted identifier, the first processing device checks the identity of the second processing device and ends communication if the public key provided by the second processing device does not match the trusted identifier. The trusted identifier may be a hash of a public key of the second processing device pinned to a URL identifying a communication endpoint of the network connected processing device. The URL thus includes an encoded, trusted identifier. The technology takes advantage of public key pinning techniques to provide the trusted identifier.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read -only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates a computing environment 100 in which the present technology may be utilized. Environment 100 includes a first processing device 102 and a second processing device 106 which may communicate via a network 104. Network 104 may be any combination of public and private networks which enables communication between devices 102 and 106, as well as any number of other processing devices (not shown). First processing device 102 may alternatively be referred to herein as a server, and includes an API 112 providing access to an application or database 135. APIs may be provided by any of a number of different service providers operating one or multiple processing devices 102 to provide access to any number of different resources such as application/database 135. In the context of the present disclosure, the underlying resource to which API 112 provides access is not critical to the technology. Ensuring the identity of the server providing access to the API is an objective of the present technology.

Processing device 102 may also include a certificate store 140 which may be utilized in conjunction with cryptographic services 145 to allow for authentication of device 102 and encrypted communications between processing device 102 and other processing devices when communicating over an un-secure network, which may include network 104. Certificate store 140 may include identification information in the form of private and public server certificates. A public certificate is configured to identify processing device 102 to other processing devices utilizing a public key encryption service. A private certificate may be used to decrypt communications encrypted with a public certificate of processing device 102. Certificate store 140 may also include public certificates of processing devices (such as processing device 106) with which device 102 communicates. A user interface 114 allows a user to interact with various components of processing device 102.

Processing devices 102 and 106 may each comprise a computing device such as that illustrated with respect to FIG. 7.

Processing device 106 is alternatively referred to herein as a client device, and in one aspect represents a device which securely consumes the API 112 on processing device 102. Device 106 includes an API access application 120 which may be configured to utilize the data and services provided via the API 112. The API access application 120 may include a user interface 125 to allow configuration of the access application by, for example, a user 124. In one embodiment, no user interface 125 is provided. Processing device 106 may include a certificate store 155 which stores a set of public and private certificates in the same manner as certificate store 140. Device 106 may also include cryptographic service 165 serving the same function as cryptographic services 145, and a data store 150 which includes one or more trusted identifiers associated with processing devices with which device 106 communicates, as described herein.

API access application 120 is configured to receive a network resource address for the API which includes an encoded trusted identifier of the processing device 102 hosting the API. API access application 120 is configured to initiate a communication with the processing device 102 and receive a server public key purporting to identify the second processing device. API access application 120 is configured to compute a hash of at least a portion of the server public key and compare the computed hash against the encoded trusted identifier. If the calculated value does not match the trusted identifier, then API access application 120 is configured to end communication with the second processing device.

Illustrated in FIG. 1 is a trusted identifier distribution channel 116. The trusted identifier distribution channel 116 illustrates the transmission of one or more network resource addresses and associated trusted identifiers to a processing device, or a user of a processing device, such as device 106 and user 124. The trusted distribution channel 116 is a secure distribution channel and may comprise any electronic or non-electronic, or network or non-network based, secure communication channel. Distribution channel 116 may be implemented via an electronic communication between the device 102 and device 106, by providing the identifier to a user via the user interface 125 or 114, or by securely delivering the identifier in a physical document, allowing the user to enter the network resource address and trusted identifier to the API access application 120 via the user interface 125. In another embodiment, the network resource address and associated trusted identifier may be distributed via an electronic secure distribution channel such as an encrypted communication channel. In yet another embodiment, the distribution may be by an electronic storage device (such as a portable flash drive) physically transmitted (handed, shipped, or couriered) to a user of a processing device seeking to communicate with the processing device 102.

As discussed below, the trusted identifier may be used as part of a cryptographic process to identify processing device 102 during a negotiation to establish a secure communication channel. In this case, where the trusted identifier distribution is an electronic communication, such communication should occur via a separate secure communication channel.

Figure 2:
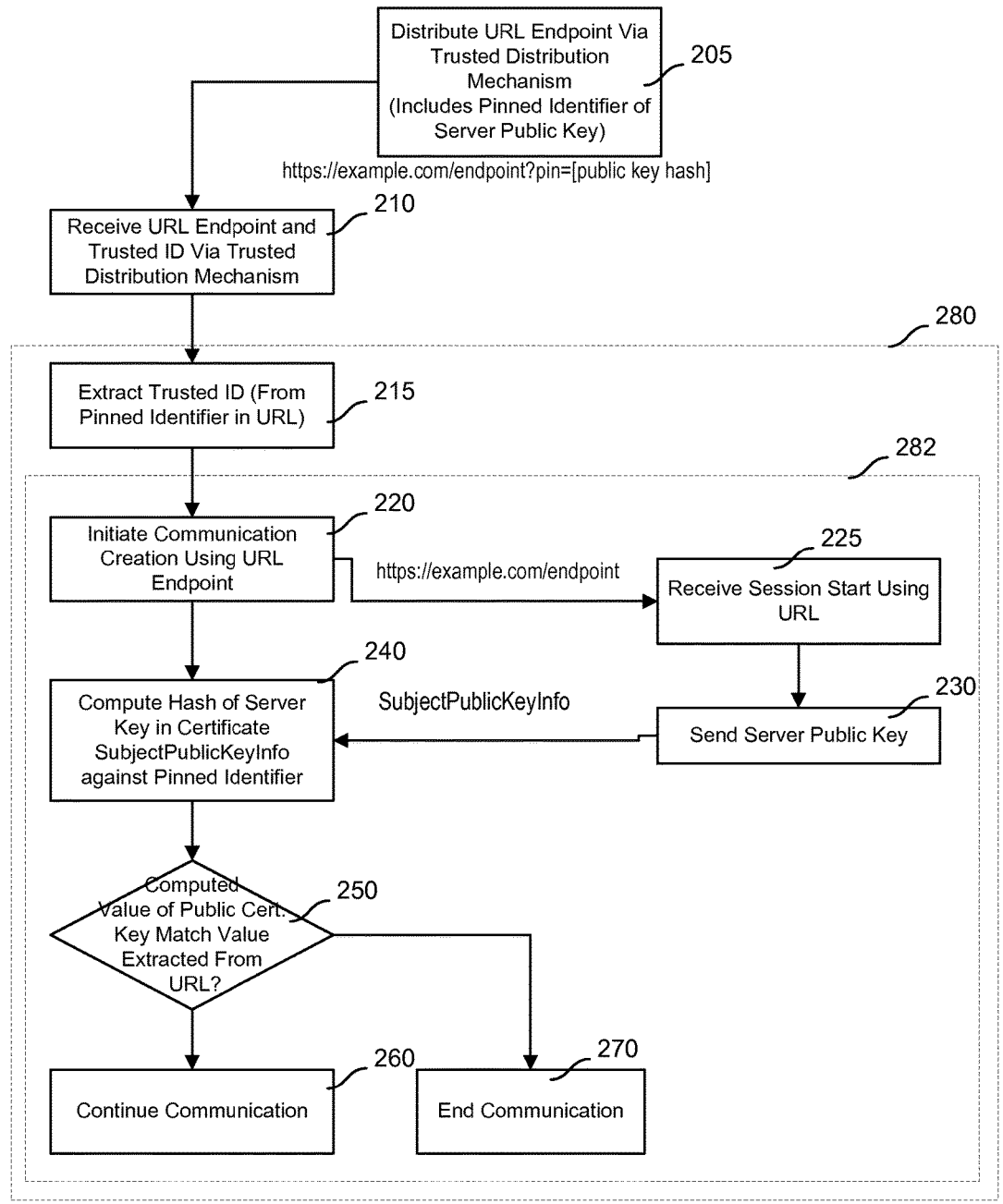
FIG. 2 is a flow-chart illustrating a method of utilizing a public key pinned URL to authenticate a communication.

FIG. 2 illustrates a method in accordance with the present technology. Aspects of the method of FIG. 2 may be implemented by machines such processing devices 102, 106 and are adapted to allow at least one of two machines communicating with each other via electronic forms of communications ensure the identity of another machine. The technology ensures that where a first processing device (i.e. processing device 106) initiates a communication with a second processing device (i.e. processing device 102), the identify of processing device 102 is authentic.

At 205, a network resource address and associated encoded identifier are distributed via a trusted distribution mechanism. The address and identifier may be distributed in response to a request to allow the first processing device access to the resources available through the API provided on a second processing device. In one embodiment, the network resource address takes the form of a uniform resource locator (URL) with an encoded trusted identifier of a server, such as processing device 102. The URL takes the form of a host name and optionally a path and/or query string following the host name. The encoded identifier may be provided in the path or in the query string portion of the URL. The network resource address may comprise a network endpoint at which a service, such as an API, may be accessed. In one embodiment, the trusted identifier comprises a hash of a public key of a processing device, referred to herein as a "server public key." A server public key is a cryptographic key that can be obtained and used by anyone to encrypt messages intended for a particular device recipient, such that the encrypted messages can be deciphered only by using a second, private key known only to the recipient device. In one embodiment, identifier is pinned to the URL using Public Key Pinning techniques.

Public Key Pinning (PKP) is a mechanism allowing websites to specify which CAs have issued valid certificates for the website, and for user-agents to reject TLS connections to those sites if the certificate is not issued by a known-good CA. PKP binds a set of hashed public keys to a domain name such that when connecting to a site using TLS, the browser ensures that there is an intersection between the public keys in the computed trust chain and the set of fingerprints associated with that domain. This check is done during the certificate verification phase of the connection, before any data is sent or processed by the browser.

Public key pinning detects when the public key of a certificate for a specific host has changed. Such a change may happen when an attacker compromises a CA such that they are able to issue valid certificates for any domain. Any attacker intercepting a connection from a visitor to a server with a forged certificate can only be prevented by detecting that the public key has changed. PKP is implemented by a client after establishing a TLS session with the server. At such point, a user agent will look up any stored pins for the given hostname and check whether any of those stored pins any associated certificates. Hence, key pinning is a trust-on-first-use mechanism—the first time a user agent connects to a host, it lacks the information necessary to perform pin validation. Thus, key pinning cannot protect against man-in-the-middle attackers capable of passing certificate chain validation procedures.

The present technology applies the principle of PKP as a client-side validation check against a known-good trusted identifier, blocking the establishment of an encrypted communication session (such as the aforementioned TLS session) if the trusted identifier check fails. The present technology eliminates the need for a trust on first use between the first and second processing devices. The trusted identifier need not be bound to any certificate authority, but rather is bound to any public key provided by a server in the representative exchanges described herein.

A pinned identifier in accordance with the present technology may take the form: https://example.com/endpoint-?pin=[public key hash]. In this embodiment, the encoded identifier is embedded after the query string separator character. The encoded identifier may also be positioned in the path, or anther position excluding the host name in the network address.

At 210, the network resource address with the trusted identifier is received at the first, client processing device. In this context, the first or client processing device is the user or consumer of the application programming interface which provides an interface to a network accessible application or service.

A grouping of steps 280 illustrates one embodiment authenticating a processing device which is utilized at the initiation of a secure communication channel between the first processing device and the second processing device. It should be understood that the application of the technology herein need not be used relative to the establishment of a secure communication channel, and other applications for the technology to authenticate one processing device to another exist.

At step 215, the first processing device extracts the trusted identifier from the network resource address and identifier provided at 205. At 220, a communication is initiated with a second or server processing device at the endpoint of the network resource address (https://example.com/endpoint) in the above example). At 225, the second processing device receives the communication and initiates a communication session. One portion of the communication session includes providing a server public key at 230 to the first processing device. In one embodiment, the public key may be included in a certificate including the SubjectPublicKeyInfo structure as part of a TLS communication. At 240, the first processing device computes a hash of at least a portion of the server public key and compares the computed hash from 240 against the trusted identifier at 250. If the calculated value matches the identifier, then communication continues at 260. If the values do not match, the communication ends at 270. In one embodiment, the communication ends by the first processing device not sending further communications to the server.

As illustrated below in FIG. 3, the techniques discussed above with respect to FIG. 2 may comprise one portion of a TLS negotiation.

Figure 3:
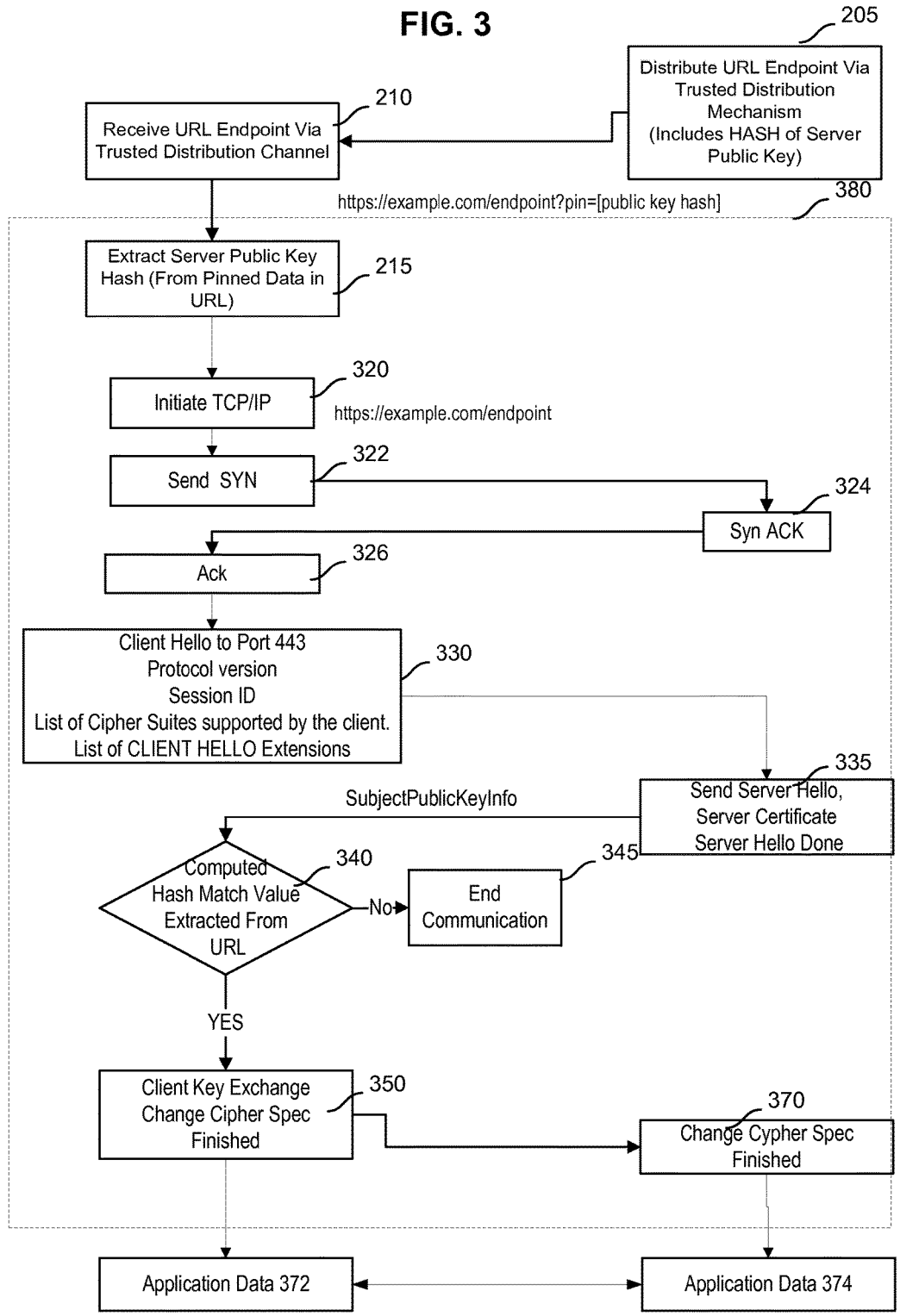
FIG. 3 is a flow chart illustrating a second embodiment of the technology utilizing an API server.

FIG. 3 illustrates a specific implementation of the method of FIG. 2 illustrating a TLS negotiation in accordance with the present technology. In FIG. 3, steps 205, 210 and 215 are the same as discussed above with respect to FIG. 2.

At 320, a client user of an API initiates a TCP/IP communication with the network endpoint (for example, https://example.com/endpoint) of for example, the API 112 of FIG. 1. At 322, a SYN (synchronize) packet is sent to initiate a TLS encrypted communication channel. The SYN packet is acknowledged by the API server by a SYN ACK packet at 324. The client returns an ACK at 326 and sends a client hello at 330 to begin the TLS session. The client hello includes a protocol version, a session ID, a list of cipher suites supported by the client and a list of client extensions. In reply, at 330 the server sends a server hello which includes a server certificate and server hello done. Included in the server certificate is the SubjectPublicKeyInfo which includes the server's public key.

At 340, the public key contained in the SubjectPublicKeyInfo is extracted, hashed and a determination made whether a match between the pinned public key hash (the trusted identifier) received at 210 matches the hash of the server certificate.

If the pinned hash and the hash of the server certificate do not match at 340, no further communication occurs by the client at 345. If there is a match, then the client issues a client key exchange and cipher spec at 360. The server acknowledges the cypher spec at 370, and the devices can now exchange application data securely at 372, 374.

As noted with respect to FIG. 2, one embodiment of a secure distribution channel may comprise a physical transfer of the identifier and network resource address. Another embodiment of a distribution channel comprising an electronic secure distribution channel is illustrated in FIG. 4.

Figure 4:
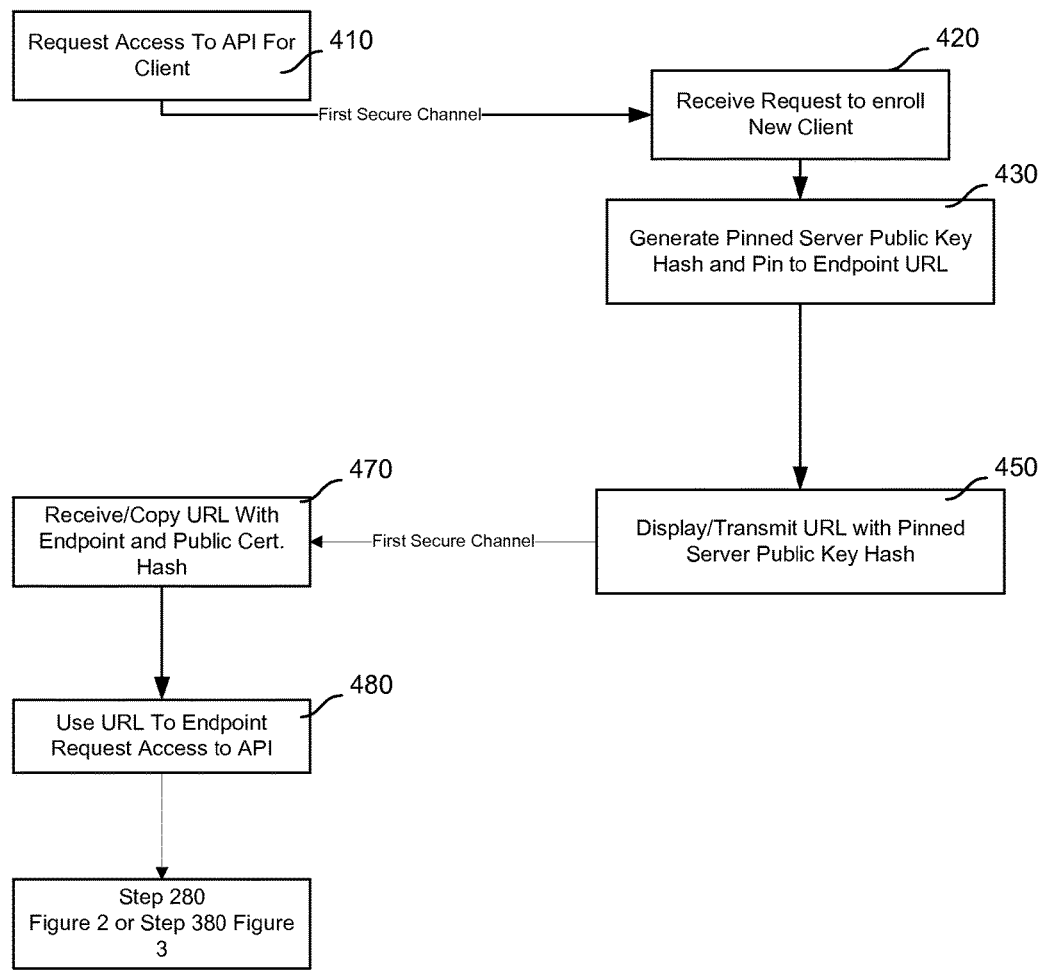
FIG. 4 is a flow chart illustrating use of an electronic distribution channel for a trusted identifier.

In FIG. 4, an exemplary electronic secure distribution channel is depicted. In one aspect, a secure electronic distribution channel may comprise an electronic communication between a distribution provider (which may include the API provider) and a client user of the API. At 410, a client device may request access to the API from the API provider via a first secure communication channel. The first secure communication channel may be a private network, a virtual private network, an encrypted channel using pre-shared keys, or any type of secured communication channel over a public network. At 420, an API provider receives a request to enroll new client and at 430, the provider generates a trusted identifier (comprising a pinned server public key hash) and associates the trusted identifier with the network endpoint of the network resource address. At 450, the network resource address and the trusted identifier may be displayed to a requesting user or otherwise transmitted to the API client. In one aspect, the identifier and URL may be displayed as part of a user interface in a display device of the client device. In a second aspect, the network resource address and identifier may be transmitted to a secure data store (such as data store 150 of FIG. 1) on the client device.

At 470 the network resource address and associated identifier are received and the URL used to requests access to the API at 480. The method thereafter proceeds to the steps 280 illustrated in FIG. 2 or steps 380 of FIG. 3. If a communication is validated per steps 280 or 380, access to the API at the endpoint identified by the URL may thereafter occur.

The aforementioned examples of FIGS. 1 and 2 illustrate use of an API via a direct connection between the API consumer (processing device 106) and the API itself. In many cases, API management portals and API gateways are utilized with API interfaces to provide management services which allow API administrators greater control over exposure and use of the API by consumers.

An API manager provides an easy way for API/service providers to use a web user interface to define service contracts for their APIs, apply these contracts across multiple APIs, and control role-based user access and API versioning. The same user interface, can allow API consumers to easily locate and access APIs. An API gateway generally applies the service contract policies of an API manager by enforcing the rules defined in the contracts and tracking API consumers' use of the APIs. In many cases, the consumer of the API service accesses the API service through a URL that designates the API Gateway as a proxy for the API service.

Figure 5:
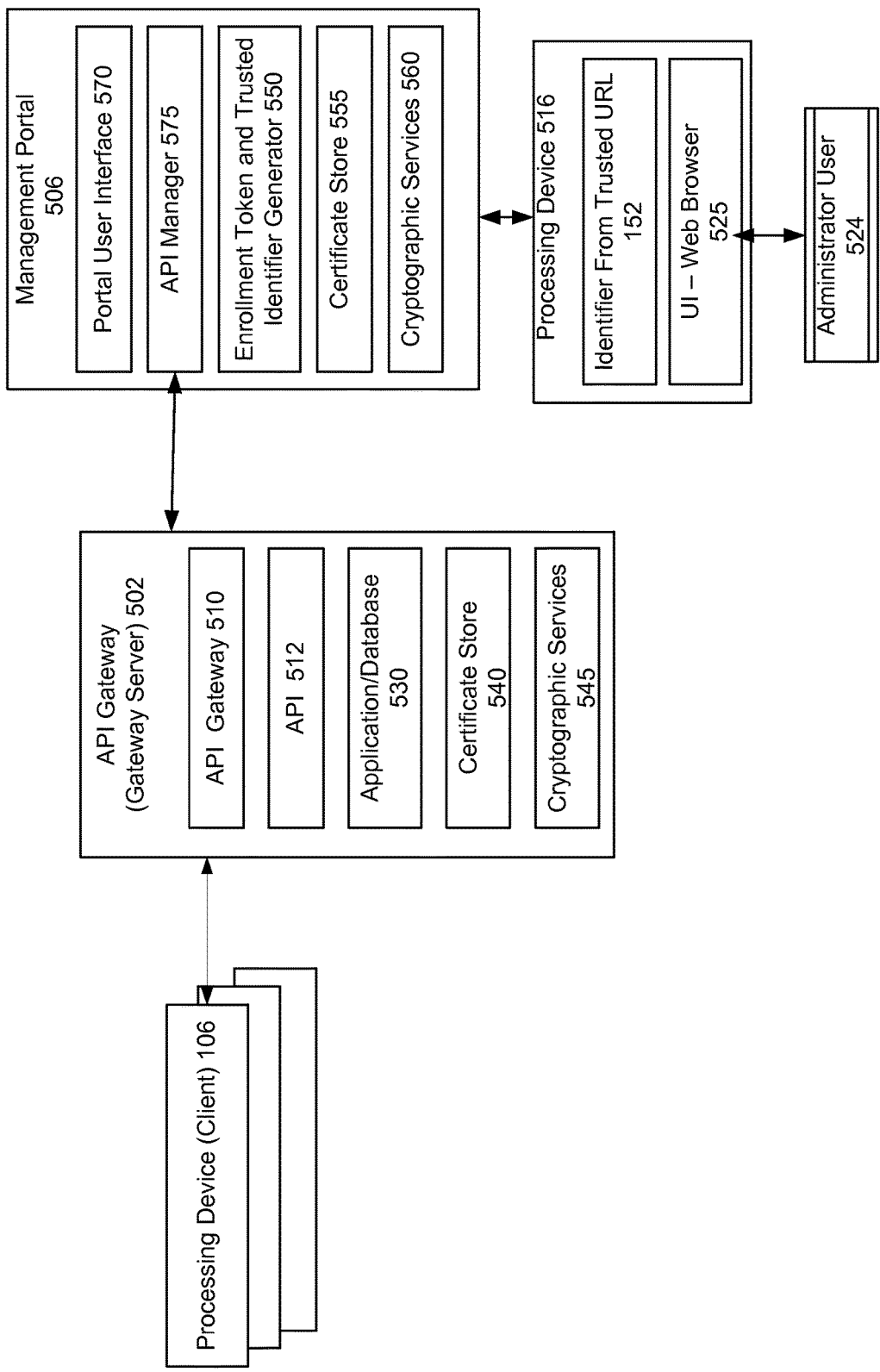
FIG. 5 illustrates a second exemplary computing environment in which the present technology may be utilized.

FIG. 5 illustrates a second computing environment implementing another aspect of the technology. In FIG. 5, an API gateway management portal 506 is utilized to allow administrators of one or more API gateways to apply management policies to API gateways. In FIG. 5, one API gateway server 502 is illustrated, but management portal 506 may provide management services for any number of API gateways and gateway servers. Each gateway server 502 may include an API gateway 510, an API 512, an application and/or database 530 to which the API provides access, a certificate store 540 and cryptographic services 545. API 512, application/database 530, certificate store 540 and cryptographic services 545 may be considered generally equivalent to API 112, application/database 135, certificate store 140 and cryptographic services 145 discussed above with respect to FIG. 2. API gateway 510 may serve as a proxy for and apply management policies to API 512.

Management portal 506 includes a portal user interface 570, an API manager 575 an enrollment token generator 550, a certificate store 555 and cryptographic services 560.

Also illustrated is a processing device 516 which may be used by an administrative user 524 to request enrollment of the gateway server 502 with the API manager 575. The processing device 516 may include a user interface which may comprise a web browser 520 and a data store including a trusted URL and identifier 152, used in the embodiment of FIG. 5 to enroll the gateway in the management portal.

Each of the processing devices illustrated in FIG. 5 may communicate via a network comprising public or private, secure or unsecure network. The technology is advantageous when the devices communicate using a public network and assurances are needed that communication between the devices is with identifiable devices.

Figure 6:
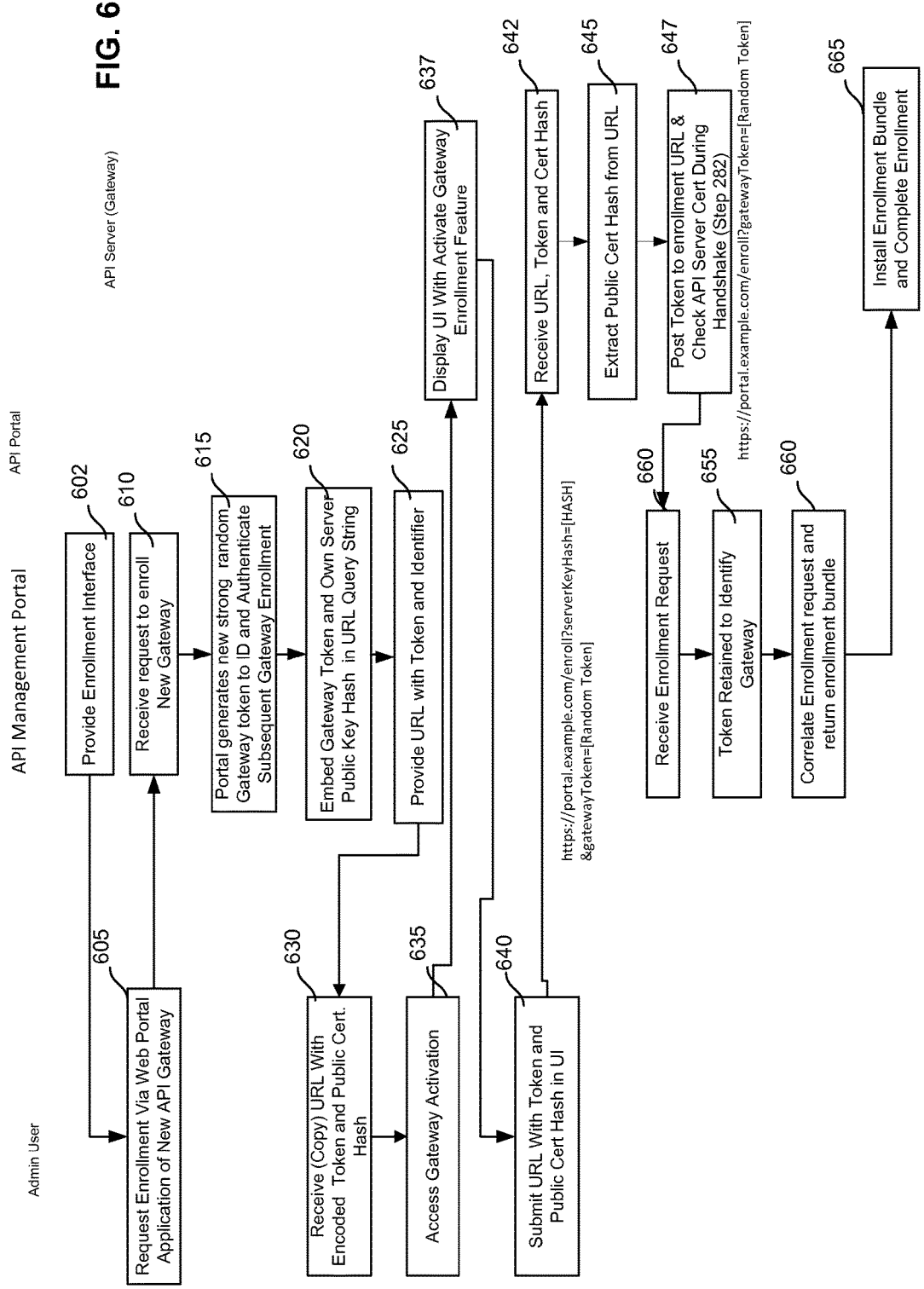
FIG. 6 is a flow chart illustrating an enrollment process utilization the present technology utilizing the present technology.

FIG. 6 illustrates a method which may be performed by elements of the computing environment of FIG. 5 to enroll an API gateway 510 in an API management portal 506 utilizing the present technology. In FIG. 6, the method steps are arranged in three columns to illustrate respective method steps performed by the elements of FIG. 5 including an administrator of an API (a user utilizing a processing device or an automated process), an API management portal, and an API gateway or server. It should be understood that the arrangement of steps in FIG. 6 is merely exemplary, and certain steps may be performed combined and performed by one actor on one processing device. For example, the steps performed by the management portal and the API server may be performed by the same device. Likewise, steps performed by the administrative user on a processing device may be performed by directly accessing a processing device hosting the API management portal.

At 602, the API management portal may provide a gateway enrollment interface accessible by an administrative user (such as user 524) for an API gateway. The enrollment interface may comprise a web page generated by the portal user interface 570 and provided to the user interface 525 of processing device 516. In another aspect, the user interface may be accessed directly on a processing device providing the management portal.

At 605, an administrative user of an API gateway seeking to manage the gateway through an API portal accesses an enrollment interface and requests enrollment of an API gateway. The specific interface and enrollment process are not unique to the present technology. The request may be made through an enrollment user interface or programmatically. At 610 the enrollment request is received by the management portal and at 615 the portal generates a gateway enrollment token to identify and authenticate a subsequent gateway enrollment. The enrollment token is a unique identifier which will be used to identify the gateway to the management portal, and in one embodiment may be a 256 bit random number. At 620, the management portal embeds the gateway token and an identifier in an enrollment query string. The enrollment query string may include a URL to a network endpoint comprising an API activation routine, the encoded gateway token, and the trusted identifier. The trusted identifier may be a trusted identifier as discussed above with respect to FIG. 2 which may comprise a server public key hash of the processing device operating the management portal. The gateway token may be encoded using any of a number of suitable web-safe Base64 encoding schemes. In one embodiment, the enrollment query string may take the generic form: https://portal.example.com/enroll?serverKeyHash=[HASH]&gatewayToken=[EncodedRandomToken]

At 625 the enrollment query string is provided to the administrative user. In one embodiment, the query string is provided by displaying the query string in a user interface of the enrollment application. This allows the administrative user to copy the enrollment query string for later use in an activation step.

At 630, enrollment query string is received by the administrative user. The enrollment query string may be stored or copied for later input into a gateway activation interface. To copy the enrollment query string into an activation interface, the administrative user may use a "copy and paste" feature well known in many processing device operating systems, may store and retrieve the enrollment query string to a storage device, or may manually enter the string.

At 635, a gateway activation interface is accessed. The gateway activation interface may be provided by the gateway activation server at 637. At 640, a request for activation of the API gateway may be submitted by providing the enrollment query string to the API gateway.

The gateway activation request will be received by the API gateway server at 642. At 645, the identifier and enrollment (or registration) token are extracted from the enrollment query string. Extraction of the hash at 645 is equivalent to step 215 in FIG. 2. At 647, the token is posted to the enrollment URL and the server certificate of the management gateway is checked. Step 647 in one embodiment performs all the steps outlined in 282 of FIG. 2. The enrollment URL and token in the form: https://portal.example.com/enroll?gatewayToken=[Random Token] are posted to the enrollment endpoint (for example, portal.example.com/enroll).

At 647, the gateway utilizes the trusted identifier to authenticate the identity of the management portal, ensuring that the administrative portal it is communicating with is the defined enrollment portal At 650, an activation request is received and the token retained to identify the API gateway at 655. At 660 the management portal correlates the enrollment request and returns an enrollment bundle (optional). At 665, the enrollment bundle is installed by the API gateway and enrollment is completed.

FIG. 7 illustrates a high level block diagram of a computer system which can be used to implement processing device 102, 106, (see FIG. 1) and/or processing device 106 (see FIG. 1). The computer system of FIG. 7 includes a processor unit 770 in communication with main memory 772. Processor unit 770 may contain a single microprocessor, or may contain a plurality of microprocessors for configuring the computer system as a multi-processor system. These one or more processors can perform the processes described above.

Main memory 772 stores, in part, instructions and data for execution by processor unit 770. If the system described herein is wholly or partially implemented in software, main memory 772 can store the executable code when in operation. Main memory 772 may include banks of dynamic random access memory (DRAM) or flash memory, as well as high speed cache memory.

The system of FIG. 7 further includes a mass storage device 774, peripheral device(s) 776, user input device(s) 780, output devices 778, portable storage medium drive(s) 782, a graphics subsystem 784 and an output display 786. For purposes of simplicity, the components shown in FIG. 7 are depicted as being connected via a single bus 788. However, the components may be connected through one or more data transport means. For example, processor unit 770 and main memory 772 may be connected via a local microprocessor bus, and the mass storage device 774, peripheral device(s) 776, portable storage medium drive(s) 782, and graphics subsystem 784 may be connected via one or more input/output (I/O) buses. Mass storage device 774, which may be implemented with a magnetic disk drive or an optical disk drive, is a non-volatile storage device for storing data and instructions for use by processor unit 770. In one embodiment, mass storage device 774 stores the system software for implementing the technology described herein for purposes of loading to main memory 572. Peripheral device(s) 776 may include any type of computer support device, such as an input/output (I/O) interface, to add additional functionality to the computer system. For example, peripheral device(s) 776 may include a network interface for connecting the computer system to a network, a modem, a router, etc. User input device(s) 780 provides a portion of a user interface User input device(s) 780 may include an alpha-numeric keypad for inputting alpha-numeric and other information, or a pointing device, such as a mouse, a trackball, stylus, or cursor direction keys. In order to display textual and graphical information, the computer system of FIG. 7 includes graphics subsystem 784 and output display 786. Output display 786 may include a cathode ray tube (CRT) display, liquid crystal display (LCD), head mounter display, projector or other suitable display device. Graphics subsystem 784 receives textual and graphical information, and processes the information for output to display 786. Additionally, the system of FIG. 7 includes output devices 778. Examples of suitable output devices include speakers, printers, network interfaces, monitors, etc.

The components contained in the computer system of FIG. 7 are those typically found in computer systems suitable for use with the technology described herein, and are intended to represent a broad category of such computer components that are well known in the art. Thus, the computer system of FIG. 7 can be a personal computer, mobile computing device, smart phone, tablet, workstation, server, minicomputer, mainframe computer, or any other computing device. The computer can also include different bus configurations, networked platforms, multi-processor platforms, etc. Various operating systems can be used One embodiment of the technology described herein includes a method of identifying a first processing device to a second processing device to allow secure network communications. The method includes securely receiving a network resource address and an identifier of the first processing device. The identifier is derived from a public key of the first processing device. Communication is initiated with the first processing device at the network resource address. A public key purporting to identify the first processing device is received in response to initiating the communication. The method further includes comparing the identifier to a transformation of at least a portion of the public key to determine a match between the identifier and the transformation, and if the identifier and the transformation match, further communicating with the first processing device, and if the identifier and the transformation do not match ending communicating with the first processing device.

Another embodiment of the technology includes a computer program product a computer readable storage medium having computer readable program code embodied therewith. The computer readable program code comprises computer readable program code configured to contact a first processing device providing an application resource via a network, the application resource identified by a URL having an identifier of a public key identifying the first processing device, the identifier pinned to the URL. The computer readable program code is further configured to receive a public key certificate purporting to identify the first processing device. The computer readable program code is configured to allow communication with the first processing device when a hash of at least a portion of the public key certificate purporting to identify the first processing device matches the identifier. The computer readable program code is further configured to communicate with the first processing device based on the code configured to allow communication.

Another embodiment provides a method of securing network communications. The method includes receiving a request to enroll a first processing device in a secure communication system adapted to allow the first processing device to access resources of a second processing device via a secure communication channel over a public network. A resource address is distributed to the first processing device. The resource address is adapted to allow access to the resources of the second processing device, the resource address including an identifier derived from a public key of the second processing device, the identifier pinned to the resource address such that upon receipt from the second processing device of a public key certificate purporting to identify the second processing device, authorization of communication with the second processing device may occur by extraction of the identifier from the resource address and comparison of the identifier to a hash of at least a portion the public key certificate purporting to identify the second processing device. In one aspect, the resources comprise an API management portal, and a unique token is distributed with the network resource address and trusted identifier. The unique token is adapted to identify the first processing device to the API management portal.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of identifying a first processing device, comprising:
   securely receiving by a hardware processor a network resource address which includes an encoded identifier following a host name in the network resource address, the encoded identifier derived from a trusted public key of the first processing device;
   communicating by the hardware processor with the first processing device at the network resource address;
   receiving by the hardware processor, in response to the communicating, a communicated public key purporting to identify the first processing device; and
   comparing by the hardware processor the encoded identifier to a transformation of at least a portion of the communicated public key to determine a match between the encoded identifier and the transformation, and if the encoded identifier and the transformation of at least a portion of the communicated public key match, further communicating with the first processing device, and if the encoded identifier and the transformation of at least a portion of the communicated public key do not match, ending communicating with the first processing device;
   wherein communicating comprises forwarding a transport layer security (TLS) ClientHello message for a TLS negotiation,
   wherein receiving comprises receiving a SubjectPublicKeyInfo message from the processing device; and
   wherein further communicating comprises completing the TLS negotiation to create a secure communication channel with the processing device over a public network.

2. The method of claim 1 wherein securely receiving the network resource address includes receiving a uniform resource locator (URL) and wherein the encoded identifier comprises a hash of the known public key pinned to the URL.

3. The method of claim 1 wherein the first processing device includes an application programming interface (API) and securely receiving comprises receiving a URL specifying a network endpoint for the API provided by the first processing device.

4. The method of claim 1 wherein the communicating and receiving are performed on a public network, and the further communicating comprising creating a secure communication channel with the first processing device.

5. The method of claim 1 wherein securely receiving the network resource address and identifier comprises receiving the network resource address and encoded identifier via a secure communication channel over a public network.

6. The method of claim 1 wherein securely receiving the network resource address and identifier includes receiving the network resource address and identifier via a non-network communication.

7. The method of claim 1 wherein the first processing device includes an application programming interface (API) management portal and
   the securely receiving includes receiving from the first processing device a communication comprising a registration token, the network resource address and the identifier of the first processing device, the registration token identifying an API gateway;
   wherein the communicating further comprises extracting the identifier and connecting to the first processing device using the network resource address to provide the registration token; and
   wherein the further communicating includes receiving a registration verification with the API management portal from the first processing device.

8. The method of claim 7 wherein the securely receiving and communicating are performed by a second processing device, the second processing device comprising the API gateway, the network resource address comprises a network endpoint for the API management portal, the communication received from an API.

9. A method of identifying a first processing device, comprising:
   securely receiving by a hardware processor a network resource address which includes an encoded identifier following a host name in the network resource address, the encoded identifier derived from a trusted public key of the first processing device;
   communicating by the hardware processor with the first processing device at the network resource address;
   receiving by the hardware processor, in response to the communicating, a communicated public key purporting to identify the first processing device; and
   comparing by the hardware processor the encoded identifier to a transformation of at least a portion of the communicated public key to determine a match between the encoded identifier and the transformation, and if the encoded identifier and the transformation of at least a portion of the communicated public key match, further communicating with the first processing device, and if the encoded identifier and the transformation of at least a portion of the communicated public key do not match, ending communicating with the first processing device;
   wherein the first processing device includes an application programming interface (API) management portal and the securely receiving includes receiving from the first processing device a communication comprising a registration token, the network resource address and the identifier of the first processing device, the registration token identifying an API gateway;

wherein the communicating further comprises extracting the identifier and connecting to the first processing device using the network resource address to provide the registration token; and wherein the further communicating includes receiving a registration verification with the API management portal from the first processing device.

10. The method of claim 9 wherein securely receiving the network resource address includes receiving a uniform resource locator (URL) and wherein the encoded identifier comprises a hash of the known public key pinned to the URL.

11. The method of claim 9 wherein the first processing device includes an application programming interface (API) and securely receiving comprises receiving a URL specifying a network endpoint for the API provided by the first processing device.

12. The method of claim 9 wherein the communicating and receiving are performed on a public network, and the further communicating comprising creating a secure communication channel with the first processing device.

13. The method of claim 9 wherein securely receiving the network resource address and identifier comprises receiving the network resource address and encoded identifier via a secure communication channel over a public network.

14. The method of claim 9 wherein securely receiving the network resource address and identifier includes receiving the network resource address and identifier via a non-network communication.

15. The method of claim 9 wherein communicating comprises forwarding a transport layer security (TLS) ClientHello message for a TLS negotiation, wherein receiving comprises receiving a SubjectPublickeyInfo message from the processing device; and wherein further communicating comprises completing the TLS negotiation to create a secure communication channel with the processing device over a public network.

16. The method of claim 9 wherein the securely receiving and communicating are performed by a second processing device, the second processing device comprising the API gateway, the network resource address comprises a network endpoint for the API management portal, the communication received from an API.

* * * * *